United States Patent [19]

Matuschek

[11] 4,012,984
[45] Mar. 22, 1977

[54] BLIND RIVET ASSEMBLY WITH LOCKING COLLAR ON RIVET STEM

[75] Inventor: Josip Matuschek, Newport Beach, Calif.

[73] Assignee: Textron, Inc.

[22] Filed: June 19, 1975

[21] Appl. No.: 588,286

[52] U.S. Cl. .................................. 85/70; 85/77
[51] Int. Cl.² ............................. F16B 13/04
[58] Field of Search ............ 85/70, 71, 72, 77, 78

[56] References Cited

UNITED STATES PATENTS

| | | | |
|---|---|---|---|
| 2,526,235 | 10/1950 | Huck | 85/78 |
| 2,545,752 | 3/1951 | Singleton | 85/78 |
| 3,038,626 | 6/1962 | Simmons | 85/78 |
| 3,148,578 | 9/1964 | Gapp | 85/77 |
| 3,292,482 | 12/1966 | Fry et al. | 85/78 |
| 3,377,907 | 4/1968 | Hurd | 85/78 |
| 3,377,908 | 4/1968 | Stau et al. | 85/78 |
| 3,390,601 | 7/1968 | Summerlin | 85/78 |
| 3,489,056 | 1/1970 | Blakeley | 85/78 |

FOREIGN PATENTS OR APPLICATIONS 472,329  9/1937  United Kingdom .................. 85/77

*Primary Examiner*—Roy D. Frazier
*Assistant Examiner*—Thomas J. Holko
*Attorney, Agent, or Firm*—George B. White

[57] ABSTRACT

A blind rivet stem extending through a hollow rivet so that it may be pulled, thereby to expand the tail of the hollow rivet; a collar on the stem has a head fitting in a locking groove within the grip length of the stem so that when the tail of the collar abuts a pressure element bearing against the head of the hollow rivet, it is bulged outwardly into a recess in the rivet head, thereby to interlock the rivet stem and the hollow rivet; a weakened portion such as a break groove is provided on the stem adjacent the bulged end of the collar whereby upon further pulling the rivet breaks at said weakened portion.

8 Claims, 5 Drawing Figures

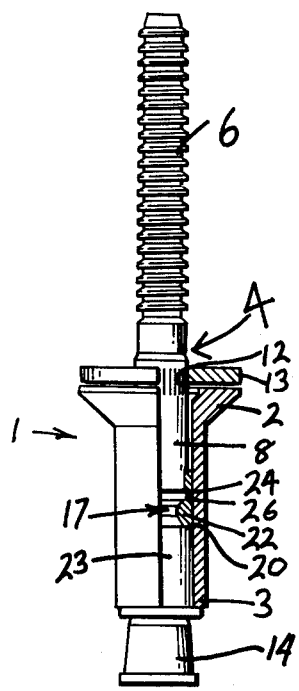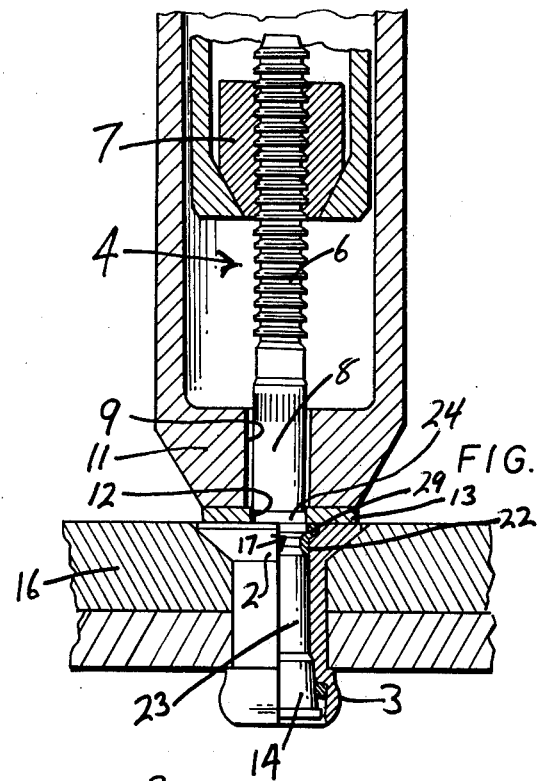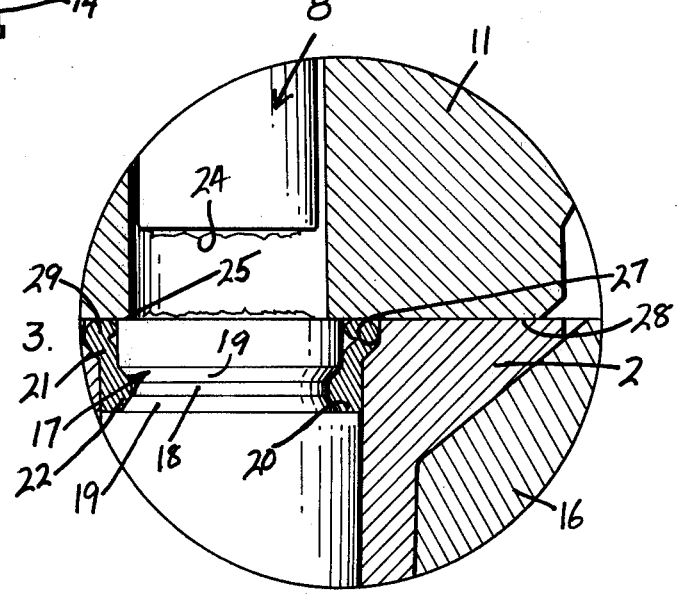

BLIND RIVET ASSEMBLY WITH LOCKING COLLAR ON RIVET STEM

BACKGROUND OF THE INVENTION

In blind rivets of the type shown in U.S. Pat. No. 3,148,578 as well as in U.S. Pat. Nos. 2,887,003; 3,489,056, special tools are required to push a locking collar into the head of the hollow rivet after the rivet stem has been pulled far enough to expand the sleeve tail and the rivet is installed. An example of such tool is shown in U.S. Pat. No. 3,038,626 wherein in the sequence of operations first the stem is pulled to expand the tail and set the rivet and after the work is clinched then in a second operation the tool is applied to push the collar from the outside into the head of the hollow rivet. Apart from the fact that such operation adds a separate step to the cycle of operations in setting the rivet, it also requires that the tension be maintained on the stem continuously after the setting of the rivet until the collar is pushed into a recess in the rivet head and this increases the cost of tooling and reduces the efficiency of the setting of the blind rivets.

The primary object of the invention is to provide a blind rivet wherein the collar is assembled on the stem in the hollow rivet so that as it is pulled to the rivet head, its tail is bulged into a locking recess in the rivet head in the same rivet setting operation thereby obviating the provision of the separate collar and also the operation of pushing a separate collar from outside into the head of a hollow rivet.

BRIEF DESCRIPTION OF THE DRAWINGS

FIG. 1 is a side view of the blind rivet assembly.

FIG. 2 is a sectional view of the blind rivet fastened in the work.

FIG. 3 is an enlarged fragmental sectional view of the interlocking portion of the rivet stem and the rivet head without the use of a separate pressure washer.

DETAILED DESCRIPTION

Figure 4:
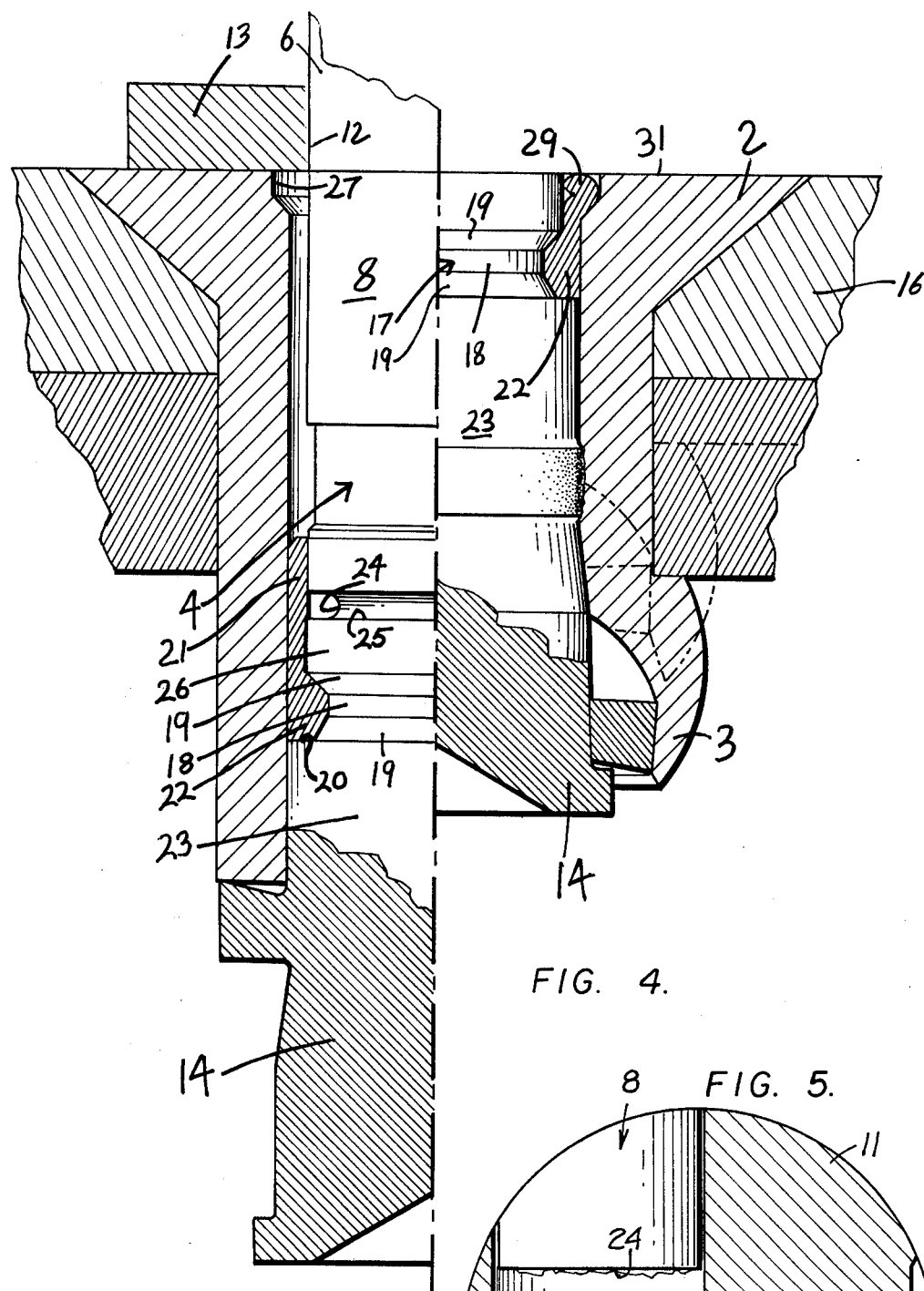
FIG. 4 is a sectional view, one-half of which shows the rivet assembly inserted in work and the other half of which shows the blind rivet fastened in work.

The rivet assembly as shown in FIG. 1 consists of a hollow rivet, tubular sleeve 1 which has a rivet head 2 on one end and a rivet tail 3 on the other end thereof. A rivet stem 4 extends through the rivet sleeve 1. The rivet stem 4 has a pulling portion 6, which in this illustration is serrated so that it can be gripped by the usual pulling chuck 7 of a tool shown in FIG. 2. A somewhat larger intermediate portion 8 is of such diameter that it can be pulled through a hole 9 in the tip of the pressure element 11 of the tool shown in FIG. 2, and also through the hole 12 of a pressure washer 13 on the rivet head 2. The tail end of the rivet stem has a tail former 14 thereon which operates in the manner shown in said aforementioned patents to expand the sleeve tail 3 into an enlarged tail as shown in FIG. 2 for clinching the plates 16 together.

An annular locking groove 17 around the stem 4 is located at a distance from the tail former 14 within the range of the grip length of the rivet so that when the work is clinched the locking groove 17 is still within sleeve 1. The locking groove 17 has a cylindrical middle portion 18 and a conical portion 19 at each end of the cylindrical portion 18. A locking collar 21 has a locking head 22 which fits into the annular groove 17 as shown on the left hand side viewing FIG. 4. The cylindrical skirt of the collar 21 extends along the stem. The portion of the stem between the locking groove 17 and the tail former 14 is the plug portion 23 of the stem. The plug portion is of larger diameter than the adjacent conical portion 18 so as to form a shoulder 20 bearing against the locking head 22.

A weakened portion such as a break groove 24 is spaced from the locking groove 17. The stem portion 26 between the locking groove 17 and the breaking groove 24 may be of larger diameter than the intermediate portion 8 so as to form an abutment shoulder 25. The intermediate portion 8 and the stem portion 26 are of smaller diameter than the inner diameter of the sleeve 1 whereby the thickness of the locking collar 21 is accommodated above the plug portion 23 as shown in FIG. 4.

The rivet head 2 has a recess 27 in its inner periphery open to the top thereof so that when the skirt of the collar 21 abuts against the pressure washer 13 or against the bottom surface 28 of the tip 11 of the pressure element, the force of pull exerted on the rivet stem and on the collar head 22 causes the rivet skirt to bulge outwardly and form an expanded interlocking annular rib 29 on the recess 27, thereby to firmly interlock the stem into the hollow rivet. The spacing between the locking groove 17 and the break groove 24 is such in relation to the skirt of the collar 21, that the abutment shoulder 25 of the stem portion 26 abuts against the pressure washer 13 at the time the skirt of the collar 21 is expanded into the head recess 27 and further pull on the rivet stem will cause the stem to break at the weakened portion 24 at about the top level 31 of the rivet head 2. The skirt of the collar 21 overlaps the break groove 24 sufficiently to provide for the interlocking rib 29 by the time the abutment shoulder 25 abuts the pressure washer 13.

Figure 5:
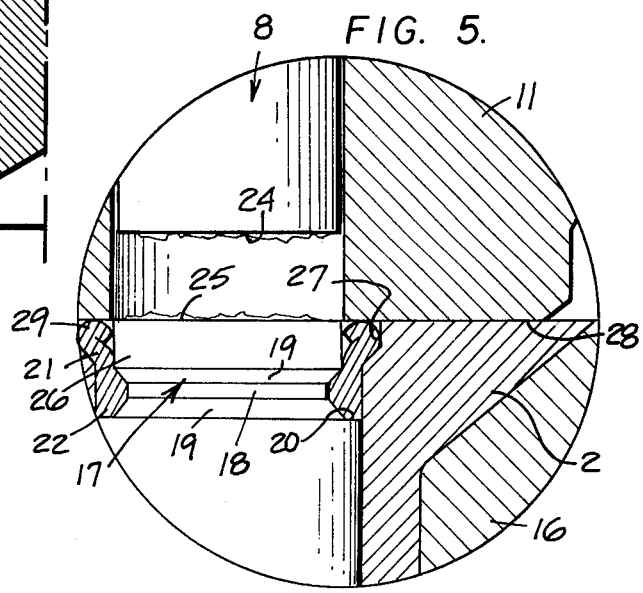
FIG. 5 is a fragmental sectional view of the blind rivet assembly with a modified stem without the use of a separate pressure washer.

It may be necessary in some instances to make this stem portion 26 of substantially the same diameter as the intermediate portion 8, as illustrated in FIG. 5, in which case the shoulder 25 will not be large enough to abut against the pressure washer 13 or the tip 11 of the pressure element. In such instances the compaction of the cylindrical skirt of the collar 21 into the recess 27 provides sufficient stopping resistance to further movement of the stem within the rivet to cause the stem to break at the weakened portion 24 when the shoulder 25 is substantially flush with the top level 31 of the head 2.

The rivet assembly herein accomplishes positive mechanical locking of the stem to the rivet sleeve without any exterior collar part and eliminates the special load shifting or load transfer-type installation and tools of the prior art; this also results in more uniform installation performance with assured flush breaking of the stem throughout a specified grip range; the assembly herein described can be installed with any available blind rivet tooling head which is capable to exert a pull on the stem and pressure reaction on the top of the washer or on the rivet head, thereby obviating the necessity for the use of special pulling heads or special installing tools.

I claim:

1. In a blind rivet assembly a tubular rivet sleeve having a preformed head at one end and an expandable sleeve tail on the other end thereof, a stem extended through said sleeve and said head, a tail former at the tail end of the stem adjacent said sleeve tail for expanding said tail, a pulling portion on the pulling end of the stem adapted to be engaged by a tool for pulling the stem, a plug portion of the stem adjacent said tail former, a locking groove in the stem adjacent said plug portion, the portion of the stem between said locking groove and said pulling portion being of smaller diameter than the interior diameter of said sleeve and head, the improvement of, a locking collar around said stem initially completely inside said sleeve spaced from said preformed head, a locking head on said locking collar initially held in said locking groove whereby said locking collar moves with said stem through said sleeve, said rivet head having a recess at the inner periphery of the rivet head, said locking collar being of such material as to be bulged outwardly into said head recess when obstructed from further movement with said rivet stem.

2. The blind rivet assembly specified in claim 1, and a weakened part in said stem, the spacing between said weakened part and said tail former being within the range of the grip length of the rivet whereby said weakened part breaks in substantial registry with the top of said rivet head when the bulging of said collar into said head recess stops the movement of said stem.

3. The blind rivet assembly specified in claim 2, and said weakened part being a break groove spaced from said locking groove, said locking collar fitting slidably in said sleeve and overlapping said break groove, the spacing between said locking groove and said break groove accommodating sufficient material of said locking collar to bulge into an interlocking rib filling said recess in said rivet head.

4. The blind rivet assembly specified in claim 1, and a pressure washer assembled around said rivet adjacent said rivet head and having a hole therethrough of smaller diameter than the diameter of said locking collar thereby to cause the said collar to bulge outwardly as the stem is being pulled and said washer is pressed against said rivet head.

5. The blind rivet assembly specified in claim 1, and an abutment shoulder on said stem of larger diameter than the portion of the stem between said weakened part and said pulling portion, for stopping the movement of the stem relatively to said sleeve, a pressure washer assembled around said stem adjacent said rivet head and having a hole therethrough of larger diameter than the pulling portion of said stem but of smaller diameter than said collar and the diameter of said abutment shoulder thereby to cause the bulging of said collar outwardly into said head recess and causing the pulling portion of the stem to break at said weakened part by further pull on the stem.

6. The blind rivet assembly specified in claim 1, and said locking groove having a cylindrical middle portion and a conical tapered portion on both sides of cylindrical portion tapering inwardly.

7. The blind rivet assembly specified in claim 6, and said locking collar fitting tightly into said sleeve, the conical portion of the locking groove adjacent said plug portion of the stem tapering outwardly to a distance spaced from the outer periphery of said plug portion, thereby to form a shoulder bearing against said locking head of said collar.

8. The blind rivet assembly specified in claim 1, and a weakened part in said stem, an abutment shoulder on said stem of larger diameter than the portion of the stem between said weakened part and said pulling portion, for stopping the movement of the stem relatively to said sleeve, the spacing between said weakened part and said tail former being within the range of the grip length of the rivet whereby the relative movement of the stem is stopped by said breaking shoulder when said breaking shoulder is in substantial registry with the top of said rivet head.

* * * * *